L. E. IMUS.
LOCK NUT.
APPLICATION FILED JUNE 4, 1917.

1,265,335. Patented May 7, 1918.

Witness
C. P. Hardy
E. L. Mueller

Inventor
L. E. Imus
By Chandler & Chandler
Attorney

UNITED STATES PATENT OFFICE.

LUTHER E. IMUS, OF ATOLIA, CALIFORNIA.

LOCK-NUT.

1,265,335.   Specification of Letters Patent.   Patented May 7, 1918.

Application filed June 4, 1917. Serial No. 172,750.

*To all whom it may concern:*

Be it known that I, LUTHER E. IMUS, a citizen of the United States, residing at Atolia, in the county of San Bernardino, State of California, have invented certain new and useful Improvements in Lock-Nuts; and I do hereby declare the following to be a full, clear, and exact description of the invention, such as will enable others skilled in the art to which it appertains to make and use the same.

This invention is an improvement in lock nuts and has for one of its objects to provide a simple and inexpensive lock which will effectively prevent accidental removal of the nut from a bolt and which may be released when desired to detach said nut.

Another object is the provision of an improved releasing device employed, when removing the nut, for the purpose of preventing operation of the lock.

The inventive idea involved is capable of receiving a variety of mechanical expressions, one of which, for the purpose of illustrating the invention, is shown in the accompanying drawing, wherein:—

Figure 1:
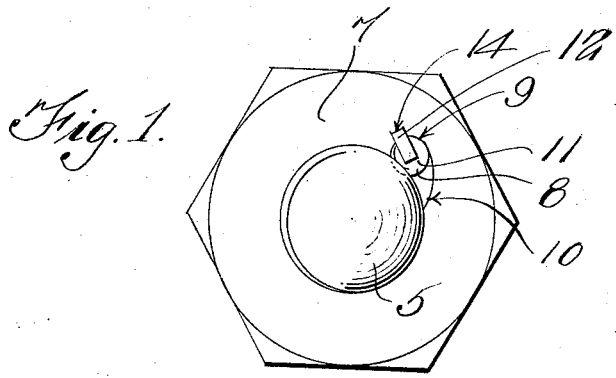
Figure 1 is a plan view of a bolt and nut showing the invention applied thereto.
Figure 2:
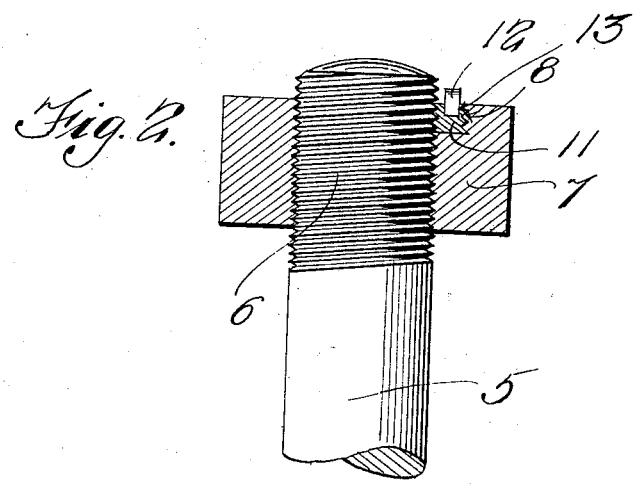
Fig. 2 is a longitudinal section through the bolt and nut.

In the drawings, the numeral 5 indicates a bolt having the usual screw threads 6 on the shank thereof upon which the nut 7 is adapted to be mounted.

In carrying out the invention, the outer face of the nut 7 is preferably provided with a recess 8 extending partially through the nut and opening upon the inner periphery thereof. One end of the recess 8 is enlarged and rounded as indicated at 9 and the wall 10 of the recess is curved and made to approach the periphery of the bolt so as to provide an elongated recess.

Figure 3:
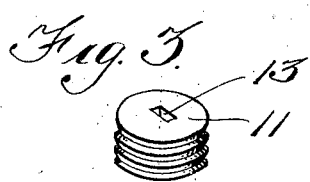
Fig. 3 is a detail perspective view of the locking key employed in connection with the invention.
Figure 4:
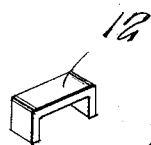
Fig. 4 is a similar view of the releasing device.

A locking key 11, preferably in the form of a pin, is mounted and normally engages in the enlarged end 9 of the recess and is provided with circumferential grooves as illustrated in Fig. 3 of the drawings, which are adapted to engage the threads of the bolt 5. The key having been so mounted, the nut is then threaded upon the bolt and, by turning the nut to the right, it will be apparent that the key will be retained in the enlarged end 9 of the recess. Any movement of the nut to the left, however, will cause the locking key to move toward the reduced or contracted portion of the recess but owing to the tapered construction thereof the key will bind between the threads 6 of the bolt and the wall 10 of said recess and thus prevent any rotation of the nut 7 in a direction to unthread the same.

The invention further involves a releasing device for permitting the removal of the nut from the bolt when desired and, to this end use is made of a substantially U-shaped releasing device 12, one extremity of which is adapted to be inserted into a small opening 13 formed in the outer end of the locking key while the other extremity engages in a similar opening 14 formed in the outer face of the nut so that when the releasing device 12 is in engagement with the key and nut any rotation of the latter to the left will not cause a movement of the locking key toward the contracted end of the recess but the same will, to the contrary, be retained in the enlarged end of said recess thus permitting the nut to be unthreaded.

What is claimed is:—

1. In a lock nut, the combination of a bolt, a nut threaded thereon and having a tapering recess, a locking key mounted in said recess and engageable with the threads of said bolt and a substantially U-shaped releasing device engageable with said nut and locking key to prevent movement of the latter in said recess when the nut is forced in one direction.

2. In a lock nut, the combination of a bolt, a nut threaded thereon and having a recess in one surface, the recess being tapered and communicating with the inner periphery of the nut, a grooved locking key mounted in the enlarged end of said recess and engageable with the thread of the bolt and provided with an opening in one end thereof, and a substantially U-shaped releasing pin having one of its extremities mounted in the opening of said locking key and its other extremity in engagement with said nut whereby to prevent longitudinal movement of the locking key in said recess.

In testimony whereof, I affix my signature in the presence of two witnesses.

LUTHER E. IMUS.

Witnesses:
 MABEL IMUS,
 OLIVE KALAR.

Copies of this patent may be obtained for five cents each, by addressing the "Commissioner of Patents, Washington, D. C."